Patented July 5, 1938

2,122,707

UNITED STATES PATENT OFFICE 2,122,707

NITROGEN-CONTAINING RESINS

Joseph H. Balthis, Jr., Wilmington, Del., assignor to E. I. du Pont de Nemours & Company, Wilmington, Del., a corporation of Delaware No Drawing. Application March 19, 1936, Serial No. 69,725

18 Claims. (Cl. 260—2)

This invention relates to synthetic resins, more particularly nitrogen-containing resins, and to processes for the preparation thereof.

It is known that monomeric ketones react with various amines to form addition compounds. German Patent No. 266,656 describes the condensation of methyl vinyl ketone and aniline to produce beta-acetyl ethyl aniline, an oil boiling at 140°–145° C. under 10 mm. pressure. Blaise and Mare, Bull. Soc. Chim. (4), 3, 543–551 (1908), reacted ammonia and certain amines with various monomeric ketones to produce mixtures of high boiling products. In one experiment, they reacted propyl-amine with ethyl vinyl ketone and obtained a mixture of two products, both distillable, one boiling at 90°–100° C. and the other at 150°–160° C. at 12 mm. pressure. Haeseler, J. A. C. S. 47, 1195 (1925), describes the addition of ammonia to mesityl oxide to produce diacetonamine which is given the formula

$CH_3COCH_2C(CH_3)_2—NH_2$.

In general, the compounds prepared according to the prior art are non-resinous in character, being for the most part distillable liquids or crystallizable solids of relatively simple structure.

The present invention has for one of its objects the preparation of new and improved resins. Another object is the production of resins which are soluble in dilute aqueous acids. A further object is the preparation of new and improved resins which have a wide variety of uses. A still further object is the provision of a new and improved process for producing resins of the type described. Other objects will appear hereinafter.

These objects are accomplished according to this invention by reacting a vinyl ketone polymer with ammonia or a primary amine, which compounds may collectively be referred to for the purposes of this invention as compounds having amino-nitrogen to which is attached at least two hydrogen atoms. The resultant products are resins which are soluble, with the formation of salts, in the stoichiometrical amount or more of dilute aqueous acids, both mineral and organic. The preferred resins produced in accordance with the invention are also soluble in organic solvents such as dioxane, ester and ketone type solvents and to some extent in alcohols. Transparent coatings can be obtained by baking at elevated temperatures films laid down from solutions of said resins in aqueous volatile acids. Similar coatings and self-supporting films can also be obtained by evaporating the solvent from solutions of the resins in organic solvents. Some of the resins of this invention become quite insoluble on baking at about 100° C.

In practicing the invention, it is preferable to employ one of two methods in preparing these resins, as follows:

(1) The polymeric ketone is dissolved in a suitable organic solvent. Aqueous ammonia, preferably concentrated, or a primary amine is added with stirring, the reaction mixture being kept at room temperature until no further reaction takes place. The mixture is then poured into water at about 15°–20° C. to precipitate the resin, which is filtered off and dried at room temperature, preferably in vacuo. The reaction is complete when the resin separated from a sample of the reaction mixture by precipitation in water is found to be soluble in a 5% aqueous solution of acetic acid. In method (1), it is preferred to dissolve the initial resin in a water-soluble solvent because such a solvent facilitates precipitation of the resin when the reaction mixture is poured into water. However, this is not essential since the final resin can be obtained by evaporating the solvent from the reaction mixture.

(2) To a suspension of the polymeric ketone in water is added, with stirring, aqueous ammonia, preferably concentrated, or a primary amine. The resulting reaction is allowed to proceed at a temperature low enough (0°–5° C.) to prevent any precipitate of resin from forming. After the reaction is complete, the resin is precipitated by warming and stirring the suspension. The resin is then isolated and dried.

Method (2) is particularly applicable to the preparation of resins from polymeric methyl vinyl ketone and ammonia, because the ketone polymer at 0° C. actually goes into solution in dilute ammonia, but not in an amine. The final amino resin also remains in solution in ammonia, and when in such form it can be transferred directly to an acid solution without an intermediate precipitation step.

The invention will be further illustrated but is not limited by the following examples.

*Example I*

Four hundred (400) cubic centimeters of a 10% colloidal suspension of polymeric methyl vinyl ketone in water was cooled to 3° C. and 18 cc. of concentrated (27.74%) ammonium hydroxide added, with stirring. The polymeric methyl vinyl ketone dissolved without precipitation within thirty minutes. The yellow viscous solution, stable at 0°–5° C., precipitated at higher temperatures (above 5° C.). The precipitated resin was separated from water, shredded, and dried in vacuo at room temperature. The resin contained 7.56% nitrogen. The cold ammoniacal solution could be transformed directly into an acid solution without precipitation of the resin by adding 24 cc. of cold (0° C.) glacial acetic acid, and shaking.

Example II

A suspension of 13.5 grams of polymeric methyl vinyl ketone in 287 cc. of water was treated with 27 cc. of ammonium hydroxide (27.74%) as in Example I. The resulting resin contained 7.56% nitrogen and was soluble in 5% acetic acid to the extent of 10 grams of resin per 90 grams of acid solution.

The preparation of a resin from methyl vinyl ketone and varying amounts of ammonia by method (1) above is illustrated by the following examples:

Example III

A solution of 10 grams of polymeric methyl vinyl ketone in 90 grams of dioxane at room temperature was treated with 14.67 cc. of concentrated (27.74%) ammonium hydroxide (a molar ratio of ammonia to ketone polymer of 3:1), and the mixture was agitated for forty hours. The reaction mixture was poured into a large volume of water, with stirring, to precipitate the resin in fibrous form. After standing in water overnight, the resin was dried in vacuo and pulverized by grinding. The amorphous yellow powder was not fusible at 160° C. and a pressure of 2000 pounds per square inch, whereas the initial methyl vinyl ketone polymer softened at 26°–35° C. The yellow powder was easily soluble in alcohol and in a 5% solution of acetic acid in water to the extent of 10 grams of resin per 90 grams of acid solution.

Reference is made in Example III and elsewhere herein to molar quantities of the ketone polymer. One mole of ketone polymer is considered arbitrarily to be twice the molecular weight of the monomer since from theoretical considerations, the recurring structural unit of the polymer is formed by the union of two molecules of monomer.

Example IV

Example III was repeated using 10 cc. of ammonium hydroxide (27.74%) to 10 grams of methyl vinyl ketone polymer (molar ratio 2:1). The resulting resin contained 9.6% nitrogen and 10 grams of it dissolved in 90 grams of 5% aqueous acetic acid.

Example V

Example III was repeated using 4.9 cc. of ammonium hydroxide (27.74%) to 10 grams of methyl vinyl ketone polymer (molar ratio 1:1). It was necessary to knead the resinous product by hand when the reaction mixture was poured into water, to hasten precipitation. The resulting resin had essentially the same solubility characteristics as those prepared according to Examples III and IV.

When the molar ratio of ammonia to ketone polymer is less than the theoretical (1:1 molar), the acid solubility of the resulting resin decreases. If the molar ratio of ammonia to ketone polymer falls below 0.5:1, the resulting resins are essentially insoluble in dilute acids. The products prepared from 0.5–0.75 mole of amino-nitrogen compound per "mole" of polymer are either acid insoluble or only soluble with great difficulty, but those made from more than about 0.75 mole are readily soluble in the stoichiometrical amount or more of dilute aqueous acetic acid.

The following examples illustrate the preparation of resins from polymeric vinyl ketones and various amines. Example VI illustrates the use of an alicyclic amine, Example VII a sugar amine, Example VIII an amino primary alcohol, and Examples IX and X the use of a polyamine by the two previously described methods.

Example VI

Fifty grams of polymeric methyl vinyl ketone were dissolved in 250 grams of dioxane and agitated overnight with 50 grams of cyclohexylamine. A test showed that the resin was not readily soluble in dilute acid; hence, the reaction mixture was heated on the steam bath for five hours. The resin was then precipitated by pouring the reaction mixture into water, and after standing twelve hours in fresh water was filtered and dried in vacuo. The yield was 55 grams. The pulverized resin was soluble to the extent of 4 grams in 96 grams of a 5% aqueous solution of acetic acid. Relatively tough films were obtained from alcoholic or dioxane solutions of this resin.

Example VII

Five hundred (500) cc. of a 10% colloidal suspension of polymeric methyl vinyl ketone in water was cooled to 3° C., and 200 cc. of a 50% aqueous solution of glucamine were slowly added, with stirring. After two hours of stirring at 3° C., the reaction mixture was agitated for 140 hours at about 20° C. After filtering, washing and drying in vacuo, the resulting resin was soluble in a 5% aqueous solution of acetic acid to the extent of 3 grams of resin in 97 grams of acid solution.

Example VIII

Fifty (50) grams of polymeric methyl vinyl ketone were dissolved in 250 grams of dioxane and agitated overnight with 50 cc. of ethanolamine. The polymer was precipitated by running a fine stream of the reaction mixture into a large volume of water. The yellow threads were allowed to stand in fresh water for twenty-four hours, filtered, and dried in vacuo. A yield of 50 grams of resin was obtained. The pulverized resin was soluble to the extent of 7 grams in 93 grams of a 5% aqueous solution of acetic acid. Alcoholic solutions of the resin gave yellow-orange films upon baking.

Example IX

One hundred (100) grams of a 10% solution of polymeric methyl vinyl ketone in dioxane were agitated with 10 cc. of ethylene diamine for forty-eight hours. The resin was precipitated in fiber-like form by running a fine stream of the reaction mixture into a relatively large volume of water. After standing in fresh water overnight, the resin was separated from the water and dried in vacuo over sulfuric acid. Analysis indicated that the resin contained 8.91% nitrogen. The pulverized resin was soluble in 10% aqueous acetic acid to the extent of 3 grams in 97 grams of the acid solution.

Example X

Two hundred (200) cc. of a 10% suspension of polymeric methyl vinyl ketone in water were diluted to 400 cc., cooled to 3° C. and treated with 18 grams of ethylene diamine, with stirring. The ketone polymer neither precipitated nor dissolved. The suspension was allowed to stand for three days. Slight warming of the reaction mixture coagulated the suspension sufficiently for filtration. After being washed and dried in vacuo, the resulting resin was soluble in 5% aqueous acetic acid to the extent of 2 grams in 98 grams of the acid solution.

As illustrated by the following example, the invention may be applied to the preparation of resins from polymers of other vinyl ketones, viz., those in which the alpha hydrogen atom of the vinyl radical is replaced by an alkyl group.

*Example XI*

Ten (10) grams of methyl alpha-methylvinyl ketone polymer were dissolved in 200 grams of dioxane and 30 cc. of concentrated (27.74%) ammonium hydroxide were added. The mixture was allowed to stand for two days at room temperature. The resin was then obtained in solid form by precipitation and drying as in preceding examples. The resin thus obtained was found to be soluble in 5-10% aqueous acetic acid.

The invention may, furthermore, be applied to the preparation of resins from interpolymers of the monomeric vinyl ketone with other polymerizable substances. Examples XII and XIII illustrate the preparation of resins from interpolymers of methyl vinyl ketone and methyl alpha-methacrylate.

*Example XII*

Five (5) grams of an interpolymer prepared by polymerizing a mixture of 11 mole per cent of methyl alpha-methacrylate and 89 mole per cent of methyl vinyl ketone were dissolved in 45 grams of dioxane and agitated with 5 cc. of concentrated (27.74%) ammonium hydroxide for twenty-four hours. The resulting resin was precipitated in fibrous form by pouring the reaction mixture into a relatively large amount of water, with vigorous stirring. The dried resin was readily soluble in alcohols and in 2-5% aqueous solutions of acids such as acetic acid. Analysis indicated that the resin contained 8.07% nitrogen.

*Example XIII*

Twenty (20) grams of a 10% solution in dioxane of an interpolymer prepared from a mixture containing 41 mole per cent of methyl methacrylate and 59 mole per cent of methyl vinyl ketone were agitated overnight with 20 cc. of concentrated (27.74%) ammonium hydroxide. The resin was precipitated by pouring the reaction mixture into 1.5 liters of water, with stirring. The dry, light yellow aminated interpolymer was soluble in beta-methoxyethanol, toluene-alcohol mixtures and 2% aqueous acetic acid, but was insoluble in toluene alone. Films of the dry resin were resistant to water.

Similarly, the invention is applicable to the reaction of ammonia or primary amines with other vinyl ketone polymers. The expression "vinyl ketone polymer", as will be apparent from the examples, is intended to include polymers of vinyl and alpha-substituted vinyl ketones, that is, polymers of ketones containing the radical

attached to the ketone carbonyl group. In general, the preferred ketones are polymers of ketones having the general formula

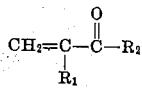

wherein $R_1$ is hydrogen or alkyl and $R_2$ is a monovalent hydrocarbon radical such as, for example, alkyl, cycloalkyl, aryl or aralkyl. For instance, $R_1$ might be hydrogen, methyl, ethyl, propyl, isopropyl, butyl, isobutyl, amyl, isoamyl, heptyl, octyl, or higher homologues; $R_2$ might be methyl, ethyl, propyl, butyl, amyl, heptyl, octyl, cyclohexyl, phenyl, tolyl, naphthyl, benzyl, and related radicals. As indicated by the examples, there may also be used in the invention interpolymers of vinyl ketones with polymerizable substances such as (a) the esters, nitriles, ammonium and metal salts, amides and N-substituted amides of acrylic, alpha-methylacrylic, and itaconic acids; (b) vinyl compounds such as chloroprene, styrene, butadiene, vinyl chloride, and vinyl acetate. Interpolymers of two or more different vinyl ketones may also be employed. In general, vinyl ketone polymers and interpolymers of vinyl ketones with esters of acrylic and methacrylic acid are particularly suitable for the purposes of this invention, e. g., interpolymers of methyl vinyl ketone with methyl acrylate, methyl alpha-methacrylate, ethyl acrylate, ethyl alpha-methacrylate, and aminoalkyl alpha-methacrylates such as beta-dimethylaminoethyl alpha-methacrylate.

The polymeric ketones which are reacted with ammonia or primary amines in accordance with this invention may be prepared in any suitable manner. Thus, the monomeric ketone such as methyl vinyl ketone may be polymerized in aqueous solution at 30°-50° C. in the presence of 0.5 to 3% of benzoyl peroxide or hydrogen peroxide as a polymerization catalyst. It is also desirable to have present about 1% of either a polymeric acid of the acrylic series (such as acrylic and methacrylic) or of an alkali metal sulfate of a long chain aliphatic monohydric alcohol. These substances act as dispersing agents for the ketone polymer as it forms and separates from solution, thus producing stable suspensions of high molecular weight polymer which are well adapted for use either directly in the present invention according to method (2), outlined above, or to processing for recovering the dry resin. For example, by freezing the stable suspension and then thawing it out while continuously removing water under reduced pressure, solid ketone polymer is obtained having a cellular (porous) structure, which form of the polymer is especially adapted for use in method (1) of this invention since it is readily purified and dissolved. In this method for preparing the vinyl ketone polymer using selected dispersing agents, it is important to keep the temperature fairly low (e. g., below 60°-65° C.) as otherwise polymers are formed which are insoluble in organic solvents such as dioxane, this insolubility making them poorly adapted for use in the present invention.

Interpolymers adapted for use in this invention may be suitably prepared by dispersing in water the vinyl ketone monomer, a polymerization catalyst and a dispersing agent of the aforesaid types, and any desired proportion of the selected polymerizable compound, heating the mixture at about 45° C. for two to three days, and precipitating the interpolymer. If desired the suspension of the interpolymer may be reacted directly with ammonia or amines.

The present invention can be carried out with ammonia or, so far as is known, any primary amine. The amine may contain one or more amino groups and, if the latter, only one of these need be a primary amino group. The amine may be an alkyl, aryl, aralkyl, alicyclic, or heterocyclic amine. It may be composed only of carbon, hydrogen, and nitrogen or it may contain substituted groups, particularly alcohol groups. The following amines may be specifically mentioned as suitable for use in the present invention: methyl, ethyl, propyl, butyl, and isopropyl amines; aniline, toluidine, and alpha-naphthylamine; benzyl and beta-phenylethyl amines; cyclohexyl, 4-methylcyclohexyl, and naphthanylamines; alpha-aminopyridine; ethylene-, tetramethylene-, pentamethylene-, and phenylenediamines; ethanolamine, glucamine, xylamine, fructamine, and lactamine. The amines most satisfactorily used in this invention are the aliphatic amines having not more than ten carbon atoms.

The nature of the reactions in this process are not known, but they are probably of the following type, where polymeric methyl vinyl ketone is reacted with a compound RNH₂:

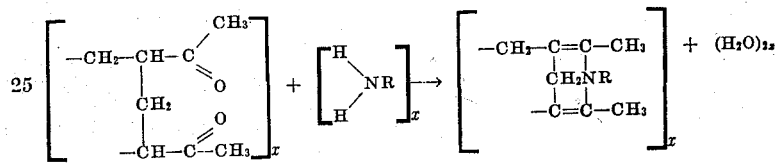

where $x$ is an integral number corresponding to the number of recurring units in the ketone polymer, and R is hydrogen or the residue of the amine molecule.

The ammonia used in the preparation of resins in accordance with the invention should preferably be employed as a concentrated solution (about 27–29%). Where amines are used, they can be added directly to the reaction mixture or they can be added in solution in a suitable solvent such as, for example, dioxane, ester solvents (for instance, ethyl acetate and butyl acetate) and ketone solvents such as acetone. Similar solvents may be used in preparing the resins according to method (1) of the foregoing description.

The ketone polymer and ammonia or amine may be reacted in any proportion sufficient to produce the desired acid-soluble products. However, in order to obtain products readily soluble in dilute aqueous acids, it is apparently necessary to use at least 0.75 mole of amino compound per "mole" of ketone polymer, and best results from the standpoint of acid-solubility are secured when the amount is 1.0 mole or more. It may be generally stated that if the vinyl ketone polymer is reacted with ammonia or a primary amine under conditions given herein and in the proportions stated, resinous bodies are obtained which are soluble in the stoichiometrical amount or more of 5% aqueous acetic acid. These bodies are also soluble for the most part in similar amounts of any water-soluble mineral or organic acid, such acid being in the form of an aqueous solution of 2–10% concentration. Treatment of the present resins with acids causes the formation of acid addition salts of the resin through reaction between the acid and the amino-nitrogen atoms in the resins. Those solutions of the resin in aqueous acid may therefore be considered as aqueous solutions of the acid salt of the resin. Among the acids which combine with the resin to yield salts are the following: hydrochloric, hydrobromic, sulfuric, phosphoric, acetic, propionic, lactic, i-butyric, malic, tartaric, naphthenic, phthalic, etc.

The temperatures may vary but, in general, it is preferable to employ relatively low temperatures, as, for example, 0° to 30° C. Higher or lower temperatures may be used.

The term "liquid diluent" is herein employed to include liquid reaction media which may be either solvent or suspension media. While it is possible to dispense with the diluent (for example, by treating the polymer with dry ammonia gas), such a medium is ordinarily required if acid-soluble products are to be obtained.

The resins described herein have a wide variety of uses. They may be artificially shaped, as molded, cast into self-supporting films or spun into filaments. Their most valuable application, however, is as coating compositions, which may range in character from simple solutions of the amino-resin in an organic solvent or an aqueous acid to compositions which contain only a small amount of the amino-resin or acid salt thereof. Typical of the latter are coating compositions in which the amino-resin is present as a dispersing and/or emulsifying agent, such as (a) aqueous emulsions of materials liquid under conditions of emulsification such as oils and waxes, (b) aqueous dispersions of materials solid under the conditions of dispersion, such as pigments, (c) compositions containing both liquids and solids. It will be understood that specific resins will be particularly well suited for specific applications, and that the aforesaid compositions may contain, when desirable, appropriate auxiliary agents such as mold or mildew inhibitors, wetting agents, anti-oxidants, plasticizers, insecticides, adhesives, other film-forming materials, thickeners, and the like.

Compositions containing the present amino-resins are valuable for all varieties of coating, the latter word being used in its broadest sense to mean applications, not only to impervious surfaces such as metal, but also to porous or fibrous bodies such as wood, brick, plaster, paper, paper pulp, asbestos, felt, cotton, wool, regenerated cellulose etc., and articles of manufacture therefrom, such as textiles. The above coating compositions also have valuable adhesive properties and the various coated materials just mentioned may be readily glued to themselves or to one another, usually with application of heat.

Specific uses for which these coating compositions are suitable are as follows: (1) as sizes for rayon tire cord, to improve its adhesion to rubber; (2) as sizes for transparent sheets of regenerated cellulose, to improve the anchorage thereto of printing inks and lacquers; (3) as water-proof glues in the manufacture of veneers; (4) as sizes and water-proofers for textiles; (5) as fixatives for acid dyes to paper; (6) as a beater size in the manufacture of chalk-filled paper; (7) and as agents for sizing and delustering fabrics and for affixing water-insoluble solids thereto. For (1), (2) and (3), it is preferable to use a solution of the amino-resin in a volatile aqueous acid; for (4) and (5), an aqueous emulsion of a wax such as paraffin and a fixing agent such as aluminum acetate, the amino-resin being present as an emulsifying agent; for (6), the same type of emulsion as for (5), except that the fixing agent is optional; and for (7), an aqueous dispersion of titanium oxide and/or other finely divided water-insoluble solid (which may be a mildew-preventive such as salicylanilide), a wetting agent, and a softener, the amino-resin being present as a dispersing agent. The present amino-resins also find use as stabilizers for acid-yielding bodies such as chlorine-containing solvents, plasticizers, resins, and rubbers.

The present invention provides simple ways for synthesizing new, cheap and useful amino-resins which have higher softening points than the polymeric ketones from which they are derived, and which can be used instead of such polymeric ketones or many other resins wherever higher softening resins are desired. Their solubility in dilute aqueous solutions of volatile acids such as acetic acid is an important property of the new resins because in such solutions the resins can be used for many purposes for which acid-insoluble resins are less applicable.

The compositions prepared in accordance with this invention are obviously different from the reaction products of monomeric ketones and ammonia or amines such as described in the prior art, and possess many uses to which said prior art products are not applicable.

As many apparently widely different embodiments of this invention may be made without departing from the spirit and scope thereof, it is to be understood that I do not limit myself to the specific embodiments thereof except as set forth in the appended claims.

I claim:

1. The process of producing nitrogen containing resins which comprises reacting together a vinyl ketone polymer and an ammonia type compound of the class consisting of ammonia and primary amines in the presence of a liquid diluent and in an amount corresponding to at least 0.75 mole of ammonia type compound per mole of polymer.

2. The process of producing nitrogen containing resins which comprises reacting together a vinyl ketone polymer and an ammonia type compound of the class consisting of ammonia and primary amines in the presence of a liquid diluent and in an amount corresponding to at least 0.75 mole of ammonia type compound per mole of polymer and continuing the reaction until a resin soluble in 5% aqueous acetic acid is obtained.

3. The process of producing nitrogen containing resins which comprises reacting together a vinyl ketone polymer and a primary amine in the presence of a liquid diluent and in amount corresponding to at least 0.75 mole of amine per mole of polymer.

4. The process of producing nitrogen-containing resins which comprises reacting together a soluble methyl vinyl ketone polymer and ammonia in the presence of a liquid diluent and in an amount corresponding to at least 0.75 mole of ammonia per mole of polymer.

5. The process of producing nitrogen-containing resins which comprises reacting together a soluble methyl vinyl ketone polymer and a primary aliphatic amine containing not more than ten carbon atoms in the presence of a liquid diluent and in an amount corresponding to at least 0.75 mole of amine per mole of polymer.

6. The process of producing nitrogen-containing resins which comprises adding a primary aliphatic amine containing not more than ten carbon atoms to a solution of a polymeric methyl vinyl ketone in an organic solvent, the proportion of amine corresponding to at least 1.0 mole per mole of polymeric methyl vinyl ketone, effecting the reaction while maintaining the polymeric methyl vinyl ketone in solution until an acid-soluble nitrogen-containing resin is formed, and separating said resin from the solution.

7. The process of producing nitrogen-containing resins which comprises adding 27 to 29% aqueous ammonia to a suspension of polymeric methyl vinyl ketone in water, the proportion of ammonia corresponding to at least 1.0 mole per mole of polymeric methyl vinyl ketone, effecting the reaction at a temperature sufficiently low to prevent precipitation of the resin, and then precipitating the resin by warming the suspension.

8. A nitrogen containing resinous reaction product of a vinyl ketone polymer and at least 0.75 mole, per mole of polymer, of an ammonia type compound of the class consisting of ammonia and primary amines, said resinous product being soluble in 5% aqueous acetic acid.

9. An acid addition product of the resin of claim 8.

10. The nitrogen-containing resinous reaction products of a vinyl ketone polymer and at least 0.75 mole, per mole of polymer, of ammonia, said reaction product being soluble in 5% aqueous acetic acid.

11. The nitrogen-containing resinous reaction product of a primary amine and a vinyl ketone polymer, said reaction product being soluble in 5% aqueous acetic acid.

12. The nitrogen-containing resinous reaction product of a soluble methyl vinyl ketone polymer with an aliphatic primary amine containing not more than ten carbon atoms, said reaction product being soluble in 5% aqueous acetic acid.

13. The nitrogen-containing resinous reaction product of a soluble methyl vinyl ketone polymer with at least 0.75 mole, per mole of polymer, of ammonia, said reaction product being soluble in 5% aqueous acetic acid.

14. A nitrogen containing resinous reaction product of at least 0.75 mole per mole of interpolymer of an ammonia type compound of the class consisting of ammonia and primary amines, and an interpolymer of a vinyl ketone and another polymerizable substance of the class consisting of vinyl esters, butadiene, styrene, chloroprene and esters, nitriles, salts, and amides of acrylic and alpha alkyl acrylic acids.

15. Solutions of resins as claimed in claim 8, which are capable of being converted into insoluble films with the aid of heat.

16. Aqueous acid solutions of the resins as claimed in claim 10.

17. Aqueous acid solutions of the resins as claimed in claim 11.

18. A coating composition comprising a solution in dilute aqueous acid of the nitrogen containing resinous reaction product of one mole of a vinyl ketone polymer and at least 0.75 mole, per mole of polymer, of an ammonia type compound of the class consisting of ammonia and primary amines, said resinous reaction product being soluble in 5% aqueous acetic acid.

JOSEPH H. BALTHIS, Jr.